United States Patent
Côté et al.

(10) Patent No.: US 6,195,247 B1
(45) Date of Patent: *Feb. 27, 2001

(54) EXCITER CONTROLLED BY FADEC SYSTEM

(76) Inventors: Pierre Côté, 12,755 28th Avenue, Montreal, Quebec (CA), H1E 2A9; Antonio Hernani Nobre, 5595 Place Viau, Brossard, Quebec (CA), J4W 1E7

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/088,686

(22) Filed: Jun. 2, 1998

(51) Int. Cl.⁷ ..................................... F23Q 3/00
(52) U.S. Cl. ........................... 361/253; 361/247
(58) Field of Search ..................... 361/247, 253

(56) References Cited

U.S. PATENT DOCUMENTS

| | | |
|---|---|---|
| 4,739,183 | 4/1988 | Tokura et al. . |
| 5,155,437 * | 10/1992 | Frus ..................................... 324/399 |
| 5,165,240 * | 11/1992 | Page et al. .............................. 60/719 |
| 5,174,718 * | 12/1992 | Lampeter et al. ...................... 416/48 |
| 5,372,112 | 12/1994 | Ohtaka et al. . |
| 5,408,412 * | 4/1995 | Hogg et al. ..................... 364/424.03 |
| 5,510,952 | 4/1996 | Bonavia et al. . |
| 5,523,691 | 6/1996 | Frus . |
| 5,561,350 | 10/1996 | Frus et al. . |
| 5,572,135 | 11/1996 | Owens et al. . |
| 5,578,880 * | 11/1996 | Lyons et al. ........................ 310/90.5 |
| 5,622,045 * | 4/1997 | Weimer et al. ........................ 60/204 |
| 5,640,055 | 6/1997 | Sugiyama et al. . |
| 5,656,966 * | 8/1997 | Wilmot et al. ....................... 327/440 |
| 5,675,257 | 10/1997 | Frus . |

FOREIGN PATENT DOCUMENTS

| | | | |
|---|---|---|---|
| 44 34 705 A1 * | 4/1995 | (DE) | ............................... G05B/9/03 |
| 0507428 | 10/1992 | (EP) . | |
| 2694341 | 4/1994 | (FR) . | |

OTHER PUBLICATIONS

PCT International Search Report, Aug. 31, 1999, European Patent Office.

* cited by examiner

Primary Examiner—Fritz Fleming

(57) ABSTRACT

The present invention is addressed to an exciter circuit used as part of an engine ignition system which is controlled by a full authority digital engine control or FADEC. Two channels of the FADEC system are connected to two channels on the exciter system in a cross talk arrangement. This permits any one channel on the FADEC to control both channels on the exciter for redundancy purposes. The establishment of a FADEC control of an exciter system also permits selective use of the exciters and reduces wear on the exciter circuitry and ignition system components.

4 Claims, 3 Drawing Sheets

EXCITER CONTROLLED BY FADEC SYSTEM

BACKGROUND OF THE INVENTION

1. Field of the Invention

The present invention is addressed to an exciter circuit used as part of an engine ignition system, and in particular, an exciter circuit controlled by a full authority digital engine control, or FADEC.

2. Description of the Prior Art

Conventional ignition systems are well known in the art and typically include an exciter circuit having an energy storage device such as a capacitor and a circuit for charging the capacitor. The system will also include one or more igniter plugs in the circuit and a switching mechanism as part of a discharge circuit connected between the capacitor and the igniter. In aerospace applications, the switching mechanism has commonly been a spark gap, although more recently, solid state switching systems utilizing semiconductors have been employed in place of the older spark gap switching.

Because of the numerous electronic inputs and controls that must be exercised over a modern gas turbine engine, a system known as a Full Authority Digital Engine Control, or "FADEC", has evolved to assist an aircraft pilot in managing these various inputs and controls. The FADEC is essentially a multiple channel computer that receives a limited number of information inputs from the aircraft pilot, as well as continuous input from the various sensors, switches, and drivers that are placed throughout the engine system. The FADEC analyzes the various inputs from these devices and sends control signals back to these devices to manage their operation. The FADEC system is known in the art, and was first disclosed in U.S. Pat. No. 4,718,229 to Riley issued on Jan. 12, 1988.

SUMMARY OF THE INVENTION

To date, no known attempt has been made to link the exciter system described above to a FADEC system. Because the exciter system components are vulnerable to failure as a result of uncontrolled use, such as when a continuous ignition start up is attempted, the introduction of the FADEC to control the exciter system offers the possibility of carefully controlling exciter usage and extending the service life of both the exciter as well as the associated igniters. The use of the FADEC also permits an automated detection of exciter failure, and an ability to switch to working exciters in the event of such a failure. This permits the aircraft to safely remain in flight service despite the failure of some of the exciters, thus reducing the overall down time of the aircraft. The use of the FADEC to control the exciter also opens up the possibility of overriding a communications failure with the exciter. The ability of a FADEC to switch communications channels when it detects a communications failure with a component assures constant control and management by the FADEC, and improves overall flight safety.

It is a feature of the present invention to provide a control system to an engine exciter system which controls and manages the usage of the exciter system.

It is another feature of the present invention to permit automated detection of an exciter failure, and automatic switching to a working exciter upon the detection of such a failure.

It is a further feature of the present invention to detect a communications equipment failure with the exciter, and override the failed communications equipment by automatically switching to the communication equipment of another channel.

According to the above features, from a broad aspect, the invention comprises an engine control system for controlling an exciter circuit. The control system has a processor with first and second channels. Each of the channels includes first and second communication ports. The system communicates with an exciter having first and second channels, with each of the channels including first and second communication ports. The system further includes power sources connected to both the processor and the exciter, as well as channel connections between the processor and the exciter for permitting each of the channels of the processor to communicate with each of the channels of the exciter.

According to the above features, from a second broad aspect, the invention provides a method of controlling a set of exciters in an ignition system. The exciters linked to a processor for receiving inputs from the exciters and sending control signals back to the exciters in response to said inputs. The method includes the steps of: (1) detecting a failure of one of the exciters; and (2) directing the processor to send control signals to another of the exciters.

According to the above features from a third broad aspect, the invention provides another method of controlling a set of exciters in an ignition system. The exciters are linked to a processor having first and second channels for receiving inputs from the exciter and sending control signals back to the exciter in response to the inputs. The method comprises the steps of: (1) detecting a communications failure in a first channel of the processor; and (2) directing the processor to send control signals from a second channel of the processor to the exciters.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION

Figure 1:
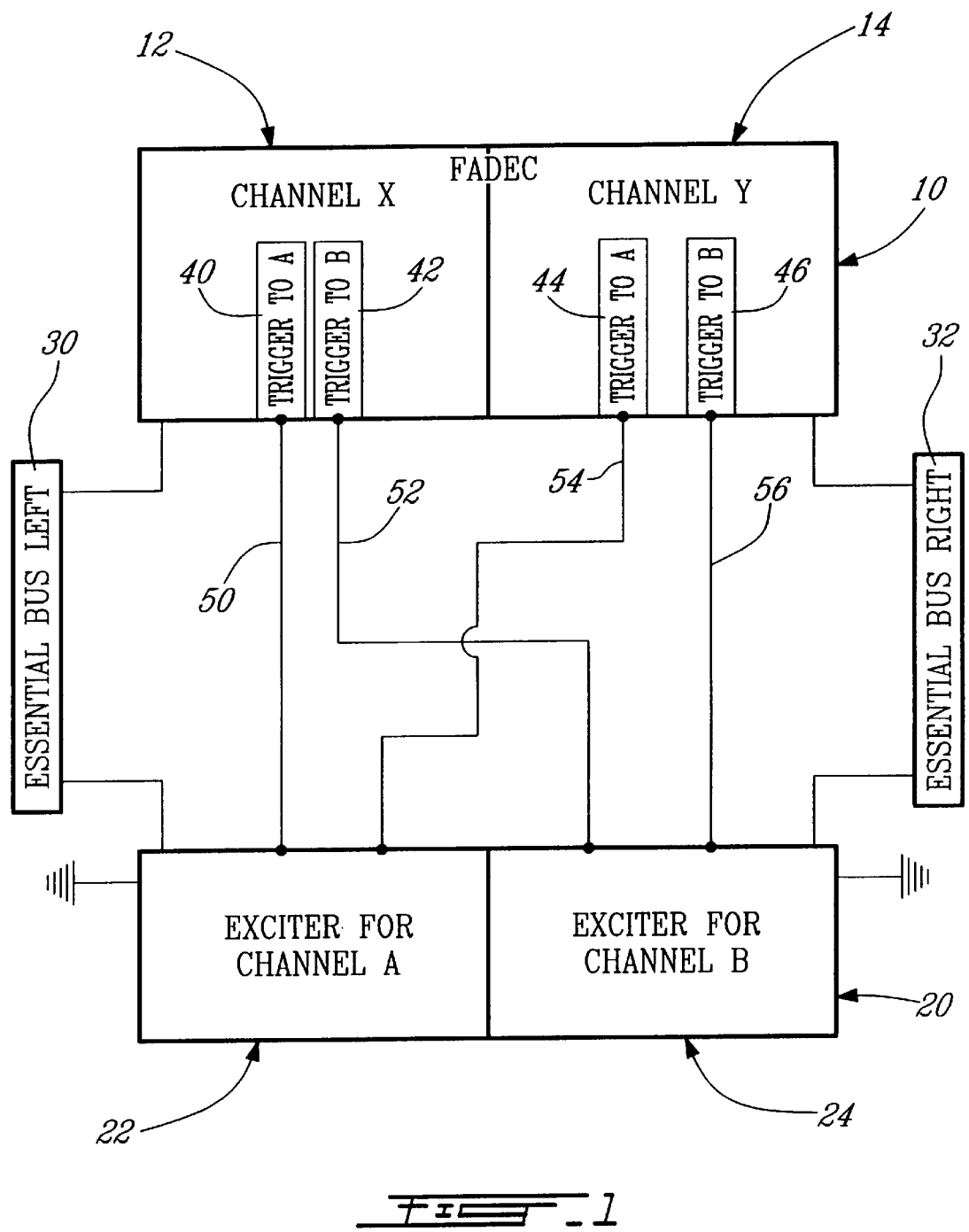
FIG. 1 is a schematic diagram of an electrical circuit permitting FADEC control of an igniter.

Reference is made to FIG. 1 which illustrates the general relationship between the Full Authority Digital Engine Control or FADEC and the exciter system. FIG. 1 shows the FADEC system generally at 10. The FADEC is multi-channel digital computer which serves to control and manage various operations of the engine and assure safe service operation. The FADEC typically has a plurality of channels, two of which are illustrated in FIG. 1. In the preferred embodiment of the invention, the FADEC dedicates two of its channels to the control of the exciter system. The channels are labeled as "Channel X" and "Channel Y" and are indicated in FIG. 1 by the reference numerals 12 and 14 respectively. Each of the channels 12, 14 contain two ports connected to solid state switches, which trigger control signals to be transmitted from the FADEC to the exciter 20.

The switches are labeled as 40, 42, 44 and 46, and are each wired into a communication line 50, 52, 54 and 56 respectively.

The exciter box is illustrated in FIG. 1 and is generally shown at 20. The exciter box includes two channels, channel A and channel B, shown by reference numerals 22 and 24 respectively. Channel A is connected to a free standing exciter circuit which includes an igniter plug, while channel B is connected to a separate, free standing exciter circuit including an igniter plug.

Power is supplied to the FADEC and the exciter box via bus bars 30 and 32. Left bus bar 30 provides power to FADEC channel X and exciter channel A, while right bus bar 32 provides power to FADEC channel Y and exciter channel B. The power supplies are arranged so as to permit isolation of a power failure. If the power supply connected between channel X and channel A fail, channel Y on the FADEC and channel B on the exciter will still be operable. Similarly, if the power connecting channel Y and channel B fail, the power supply will still be maintained between channel X and channel A.

The communication lines 50, 52, 54 and 56 are arranged between the channels in what is referred to as a "cross talk" arrangement. That is, any one channel of the FADEC can communicate with both of the channels of the exciter. Conversely, any one channel of the exciter box 20 can communicate with both of the channels of the FADEC. This is accomplished by using the lines 50 and 52 to connect channel X on the FADEC to both channels A and B on the exciter box, and using lines 54 and 56 to connect channel Y on the FADEC to channels A and B on the exciter.

The cross talk arrangement described above has several advantages which permits both safe engine operation the event of equipment failures, as well as giving the FADEC the ability to select one or both of the igniters for use during certain operation modes. For example, if the exciter circuit fails on channel A of the exciter box, the FADEC will be able to detect the failure of the circuit on this channel and continue to send control commands to the other exciter circuit connected to channel B. Thus, the aircraft can continue to remain in service, since ignition can still be controlled and managed over the exciter circuit on channel B. In a second example, if one assumes the failure of channel Y on the FADEC, then the cross talk arrangement permits channel X to assume control of the commands being sent to both channels A and B, assuring that the exciter circuits on each of these channels continue to remain in operation.

In addition to the continuous operation of the exciter circuits during failure modes, the FADEC also allows selective control over the exciters, so that either one exciter, or both exciters can be employed during certain ignition modes. For example, during ground start, a single exciter can be selected to initiate the ignition process. The FADEC can also be programmed to alternately select different exciter circuits for use during the ground start so that no one exciter circuit gets prematurely worn out, as a result of continuous use. During an inflight emergency, such as when an engine failure occurs at cruising altitude, the FADEC can trigger both exciters to attempt the ignition, thus assuring that ignition will occur, even if one of the exciter circuits or FADEC channels fails during the emergency.

Figure 3:
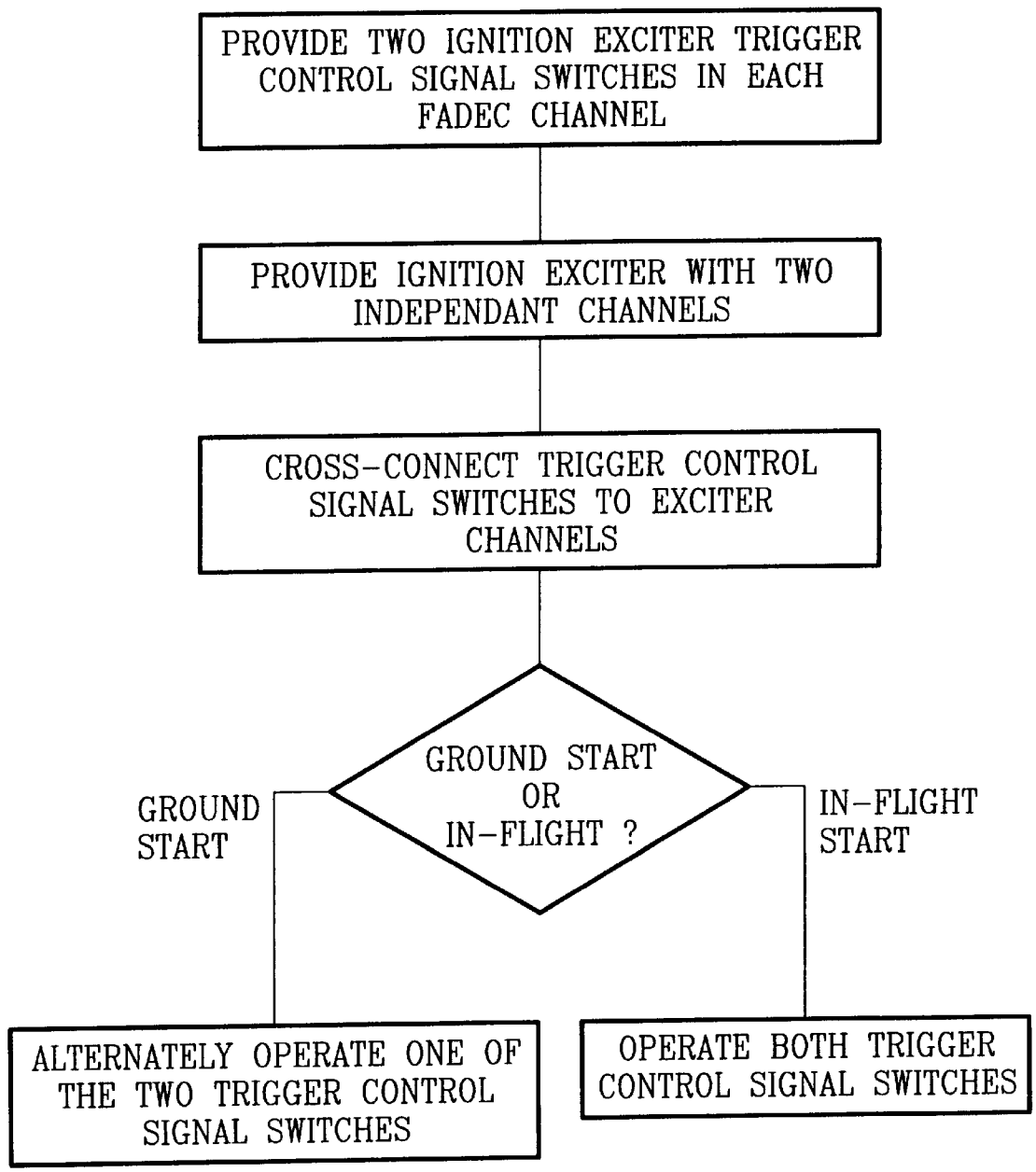
FIG. 3 is a flow chart of the method of controlling and managing exciter system usage in the present invention.

The steps involved in the method according to the invention are shown in FIG. 3.

As can be seen from the description above, using the FADEC system to control the exciter circuits offers numerous safety advantages, and can extend the service life of an engine. The cross talk wiring arrangement affords a margin of safety under several different failure modes, while simultaneously offering the ability to selectively control exciter usage to extend the service life of these circuits.

Figure 2:
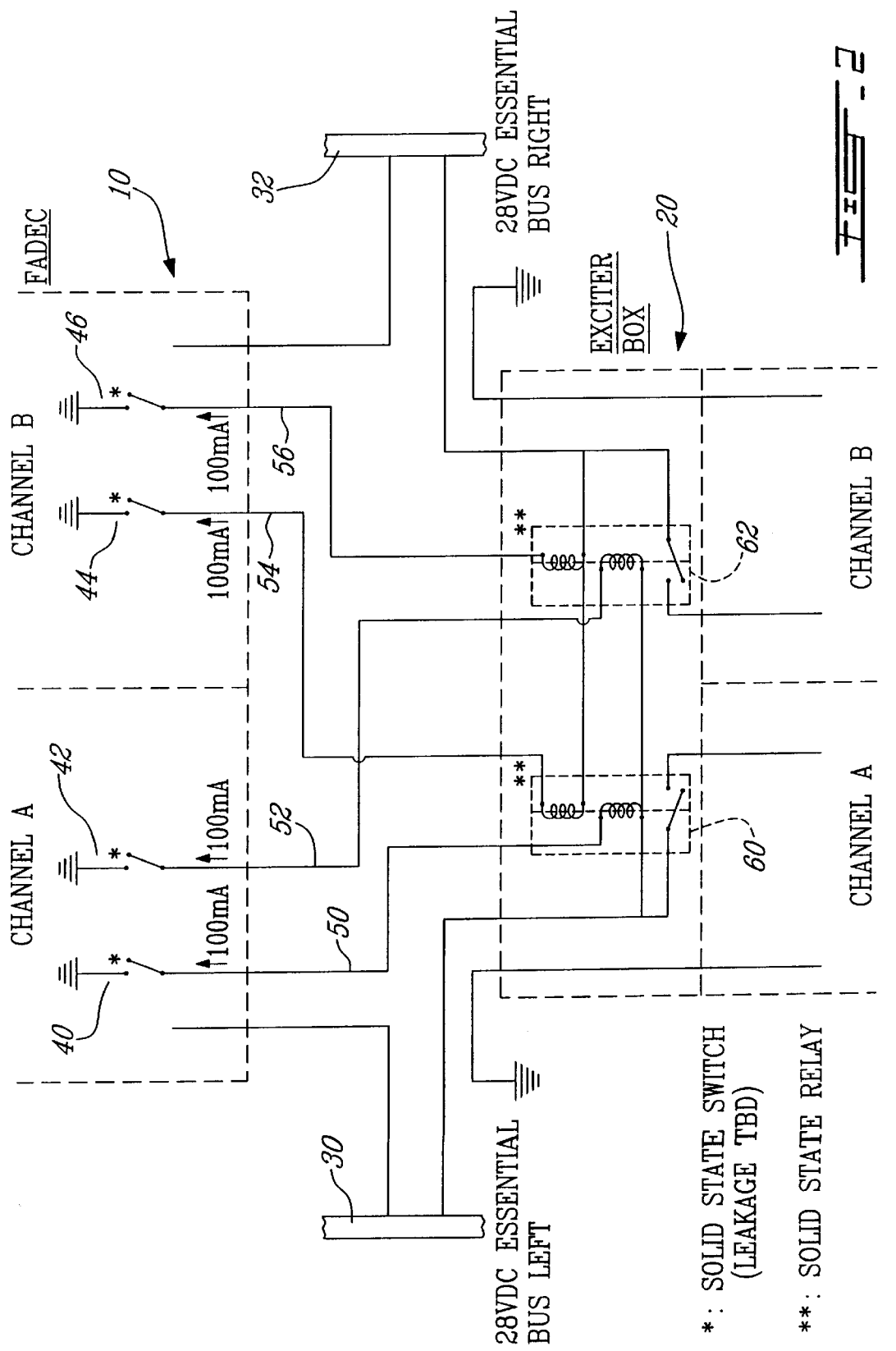
FIG. 2 is a wiring diagram illustrating the solid state circuitry utilized in the present invention.

FIG. 2 illustrates schematically in a wiring diagram the preferred system for the implementation of FADEC control of the exciter electrical/electronic circuits. The diagram of FIG. 2 closely resembles the diagram of FIG. 1, but further illustrates how the communication lines, 50, 52, 54 and 56 are functionally connected within the FADEC 10 and the exciter box 20.

Within the FADEC, each of the lines 50, 52, 54 and 56 are connected to trigger switches which control the low current flow (e.g. 1000 milliamps) towards the exciter box. The switches are solid state switches, and may be formed from semiconductors, or other types of switches which would be known to one of ordinary skill in the art. At the exciter box end, each of the lines 50, 52, 54 and 56 are connected to solid state relays 60, and 62, which control the flow of current to the exciter capacitors and igniter plugs. The bus bars 30 and 32 are also connected to relays 60 and 62 within the igniter box, to provide power to the relays or equivalent steady state switching devices, which in turn control the flow of power to the exciter capacitors and the igniter plugs.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

What is claimed is:

1. A method of controlling and managing use of a set of exciters in an ignition system of an aircraft turbine engine controlled by a full-authority digital engine control (FADEC) system having two isolated FADEC channels powered from separate power supply buses, the method comprising:

a) providing two trigger control signal switches in each one of said two FADEC channels, said two trigger control signal switches being controlled and powered by their respective FADEC channel;

b) providing an exciter system having two exciter channels, each exciter channel being connected to a free-standing exciter circuit including an exciter plug in said turbine engine;

c) connecting a first one of said two trigger control signal switches of both said FADEC channels to a first one of said exciter channels;

d) connecting a second one of said two trigger control signal switches of both said FADEC channels to a second one of said exciter channels;

e) alternately selecting one of said two trigger control signal switches in one of said FADEC channels to operate during ground starts so as to balance wear on said exciter plug of each of said two exciter channels; and f) selecting both of said two trigger control signal switches in one of said FADEC channels to operate during in-flight engine failures.

2. The method as claimed in claim 1, wherein said step (e) comprises:

selecting only one of said two trigger control signal switches in one of said FADEC channels to operate during ground starts when one of said exciter channels connected to another one of said two trigger control signal fails.

3. The method as claimed in claim 2, wherein a first one of said exciter channels is powered by a same power supply bus powering a first one of said FADEC channels, a second one of said exciter channels is powered by a same power supply bus powering a second one of said FADEC channels, and said step (e) comprises said first FADEC channel using said first exciter channel when said second FADEC channel loses power and said second FADEC channel using said second exciter channel when said first FADEC channel loses power.

4. The method as claimed in claim 1, wherein a first one of said exciter channels is powered by a same power supply bus powering a first one of said FADEC channels, a second one of said exciter channels is powered by a same power supply bus powering a second one of said FADEC channels, and said step (e) comprises said first FADEC channel using said first exciter channel when said second FADEC channel loses power and said second FADEC channel using said second exciter channel when said first FADEC channel loses power.

* * * * *

UNITED STATES PATENT AND TRADEMARK OFFICE
CERTIFICATE OF CORRECTION

PATENT NO. : 6,195,247 B1
DATED : February 27, 2001
INVENTOR(S) : Côté et al.

It is certified that error appears in the above-identified patent and that said Letters Patent is hereby corrected as shown below:

<u>Title page,</u>
Insert item [73]
Assignee: -- Pratt & Whitney Canada Corp., Longueuil, Canada --

Signed and Sealed this

Fourteenth Day of August, 2001

Attest:

NICHOLAS P. GODICI
*Attesting Officer*     *Acting Director of the United States Patent and Trademark Office*